(12) United States Patent
Johnsson et al.

(10) Patent No.: US 10,904,326 B2
(45) Date of Patent: Jan. 26, 2021

(54) NETWORK ASSISTED DEVICE-TO-DEVICE DISCOVERY FOR PEER-TO-PEER APPLICATIONS

(71) Applicant: Apple Inc., Cupertino, CA (US)

(72) Inventors: Kerstin Johnsson, Palo Alto, CA (US); Alexandre S. Stojanovski, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/783,573

(22) PCT Filed: Jun. 26, 2014

(86) PCT No.: PCT/US2014/044235
§ 371 (c)(1),
(2) Date: Oct. 9, 2015

(87) PCT Pub. No.: WO2014/210250
PCT Pub. Date: Dec. 31, 2014

(65) Prior Publication Data
US 2016/0050703 A1    Feb. 18, 2016

Related U.S. Application Data

(60) Provisional application No. 61/841,230, filed on Jun. 28, 2013, provisional application No. 61/986,492, filed on Apr. 30, 2014.

(51) Int. Cl.
*H04L 29/08* (2006.01)
*H04W 8/00* (2009.01)
(Continued)

(52) U.S. Cl.
CPC ......... *H04L 67/1061* (2013.01); *H04W 8/005* (2013.01); *H04W 76/14* (2018.02); *H04W 92/18* (2013.01)

(58) Field of Classification Search
CPC ... H04W 76/023; H04W 76/14; H04W 8/005; H04W 92/18; H04L 67/1061
See application file for complete search history.

(56) References Cited

U.S. PATENT DOCUMENTS 7,613,155 B2   11/2009   Shim
9,320,067 B2    4/2016   Ho et al.
(Continued)

FOREIGN PATENT DOCUMENTS

CN    1859799 A    11/2006
CN    1922910 A     2/2007
(Continued)

OTHER PUBLICATIONS

U.S. Appl. No. 14/128,301, Non-Final Office Action, dated Apr. 14, 2015, 25 pages.
(Continued)

*Primary Examiner* — Hassan Kizou
*Assistant Examiner* — Abdullahi Ahmed
(74) *Attorney, Agent, or Firm* — Kowert, Hood, Munyon, Rankin & Goetzel, P.C.

(57) ABSTRACT

The techniques introduced here provide for network assisted device-to-device communication for peer-to-peer applications. The techniques include registering a user's peer-to-peer application identifier with a peer-to-peer application server, registering a user's peer-to-peer application ID with a device-to-device server, sending a peer-to-peer service request to the peer-to-peer application server, and receiving network assistance in discovering a peer with the desired P2P content/service and establishing a device-to-device communication arrangement for exchange of peer-to-peer services. The network assistance is provided over the user plane.

27 Claims, 10 Drawing Sheets

(51) Int. Cl.
*H04W 76/14* (2018.01)
*H04W 92/18* (2009.01)

(56) References Cited

U.S. PATENT DOCUMENTS

| | | | |
|---|---|---|---|
| 9,549,428 B2 | 1/2017 | Xu | |
| 2007/0298793 A1 | 12/2007 | Dawson | |
| 2009/0168787 A1* | 7/2009 | Ansari | H04L 12/66 370/401 |
| 2009/0213760 A1 | 8/2009 | Shin et al. | |
| 2010/0161755 A1* | 6/2010 | Li | H04L 67/104 709/217 |
| 2011/0244886 A1 | 10/2011 | Yan | |
| 2011/0258313 A1 | 10/2011 | Mallik et al. | |
| 2012/0011247 A1 | 1/2012 | Mallik et al. | |
| 2012/0077432 A1* | 3/2012 | Rose | H04B 5/02 455/41.1 |
| 2012/0157121 A1 | 6/2012 | Li et al. | |
| 2012/0243437 A1 | 9/2012 | Horn et al. | |
| 2012/0252498 A1* | 10/2012 | Trinchero | H04W 4/02 455/456.3 |
| 2012/0269072 A1 | 10/2012 | Wu et al. | |
| 2013/0059604 A1 | 3/2013 | Zhu | |
| 2013/0150051 A1 | 6/2013 | Van Phan et al. | |
| 2013/0287012 A1* | 10/2013 | Pragada | H04W 76/045 370/338 |
| 2013/0288668 A1 | 10/2013 | Pragada et al. | |
| 2013/0316727 A1* | 11/2013 | Edge | H04W 4/02 455/456.1 |
| 2014/0010108 A1 | 1/2014 | Tavildar et al. | |
| 2014/0022999 A1 | 1/2014 | Stephens et al. | |
| 2014/0029471 A1* | 1/2014 | Tavildar | H04W 48/16 370/255 |
| 2014/0031028 A1* | 1/2014 | Yamada | H04W 76/023 455/419 |
| 2014/0066018 A1 | 3/2014 | Zhu | |
| 2014/0092885 A1* | 4/2014 | Venkatachalam | H04W 76/023 370/338 |
| 2014/0213306 A1* | 7/2014 | Blankenship | H04B 5/0031 455/457 |
| 2014/0335791 A1 | 11/2014 | Kim et al. | |
| 2014/0378123 A1* | 12/2014 | Stojanovski | H04W 52/0251 455/422.1 |
| 2015/0063095 A1 | 3/2015 | Deng et al. | |
| 2015/0142986 A1 | 5/2015 | Reznik et al. | |
| 2015/0181375 A1* | 6/2015 | Annamalai | H04W 8/04 455/456.3 |
| 2016/0037322 A1* | 2/2016 | Nguyen | H04W 56/002 370/329 |
| 2016/0057793 A1* | 2/2016 | Wang | H04W 76/14 370/329 |
| 2016/0073322 A1* | 3/2016 | Gao | H04L 69/24 370/328 |
| 2016/0157056 A1* | 6/2016 | Kim | H04W 4/023 455/414.1 |
| 2017/0111781 A1* | 4/2017 | Zhu | H04W 8/005 |
| 2017/0164332 A1* | 6/2017 | Kim | H04W 40/246 |
| 2017/0245149 A1* | 8/2017 | Yang | H04W 8/005 |

FOREIGN PATENT DOCUMENTS

| | | |
|---|---|---|
| CN | 103179575 A | 6/2013 |
| KR | 1020130064217 A | 6/2013 |
| TW | 201318382 A | 5/2013 |
| WO | 2005069670 A1 | 7/2005 |
| WO | 2011112683 A1 | 9/2011 |
| WO | 2012091418 A2 | 7/2012 |
| WO | 2014210250 A1 | 12/2014 |

OTHER PUBLICATIONS

U.S. Appl. No. 14/128,301, Final Office Action, dated Aug. 4, 2015, 17 pages.
PCT/US2014/044235, International Preliminary Report on Patentability, dated Sep. 21, 2015, 11 pages.
PCT/US2014/044235, International Search Report, dated Oct. 30, 2014, 3 pages.
U.S. Appl. No. 14/128,301, et al., Final Office Action, dated Mar. 30, 2017, 15 pages.
3GPP TR 23.703, "3rd Generation Partnership Project; Technical Specification Group Services and System Aspects; Study on architecture enhancements to support Proximity Services (ProSe) (Release 12)", V0.4.1, Jun. 2013, 85 pages.
Intel, III, Sony, "Solution for EPC Support for WLAN direct communication", S2-131696, SA WG2 Meeting #S2-97, Busan, South Korea, Agenda Item 6.4, May 27-31, 2013, 13 pages.
Intel, III, Sony, Radisys, "Solution for EPC-level ProSe Discovery", S2-131393, SA WG2 Meeting #96, San Diego, California, United States, Agenda Item 7.4, Apr. 8-12, 2013, 109 pages.
Intel, "Operator Managed and Operator Assisted D2D", S1-120063, 3GPP TSG-SA WG1 Meeting #57, Kyoto, Japan, Agenda Item 9.7 FS_ProSe, Feb. 13-17, 2012, 4 pages.
U.S. Appl. No. 14/128,301, Non-Final Office Action, dated Jan. 29, 2018, 11 pages.
U.S. Appl. No. 14/128,301, Final Office Action, dated Jul. 19, 2018, 12 pages.
U.S. Appl. No. 14/128,301, Non-Final Office Action, dated Feb. 20, 2019, 16 pages.
U.S. Appl. No. 14/128,301, Notice of Allowance, dated Sep. 16, 2019, 10 pages.
U.S. Appl. No. 14/128,301, Final Office Action, dated May 30, 2019, 16 pages.

* cited by examiner

NETWORK ASSISTED DEVICE-TO-DEVICE DISCOVERY FOR PEER-TO-PEER APPLICATIONS

RELATED APPLICATIONS

This application claims priority to and the benefit of U.S. Provisional Patent Application No. 61/841,230, filed Jun. 28, 2013 and also claims priority to and the benefit of U.S. Provisional Patent Application No. 61/986,492, filed Apr. 30, 2014, both of which are hereby incorporated by reference herein in their entirety.

TECHNICAL FIELD

The present application relates to a device-to-device communication arrangement for peer-to-peer applications and more particularly to network assisted device discovery in the device-to-device communication arrangement.

BACKGROUND ART

Typically, device-to-device (D2D) communications begin with a discovery process between the devices. Unlike standard access point (AP) or base station (BS) discovery where a device will connect to any AP/BS within proximity, in D2D communications a device is looking for a specific device or type of device (e.g., one with the desired service/content). The device discovery process often represents an enormous waste of resources, since it can take long periods of time before the specific device or type of device is within range for D2D communication.

DESCRIPTION OF THE EMBODIMENTS

Figure 1:
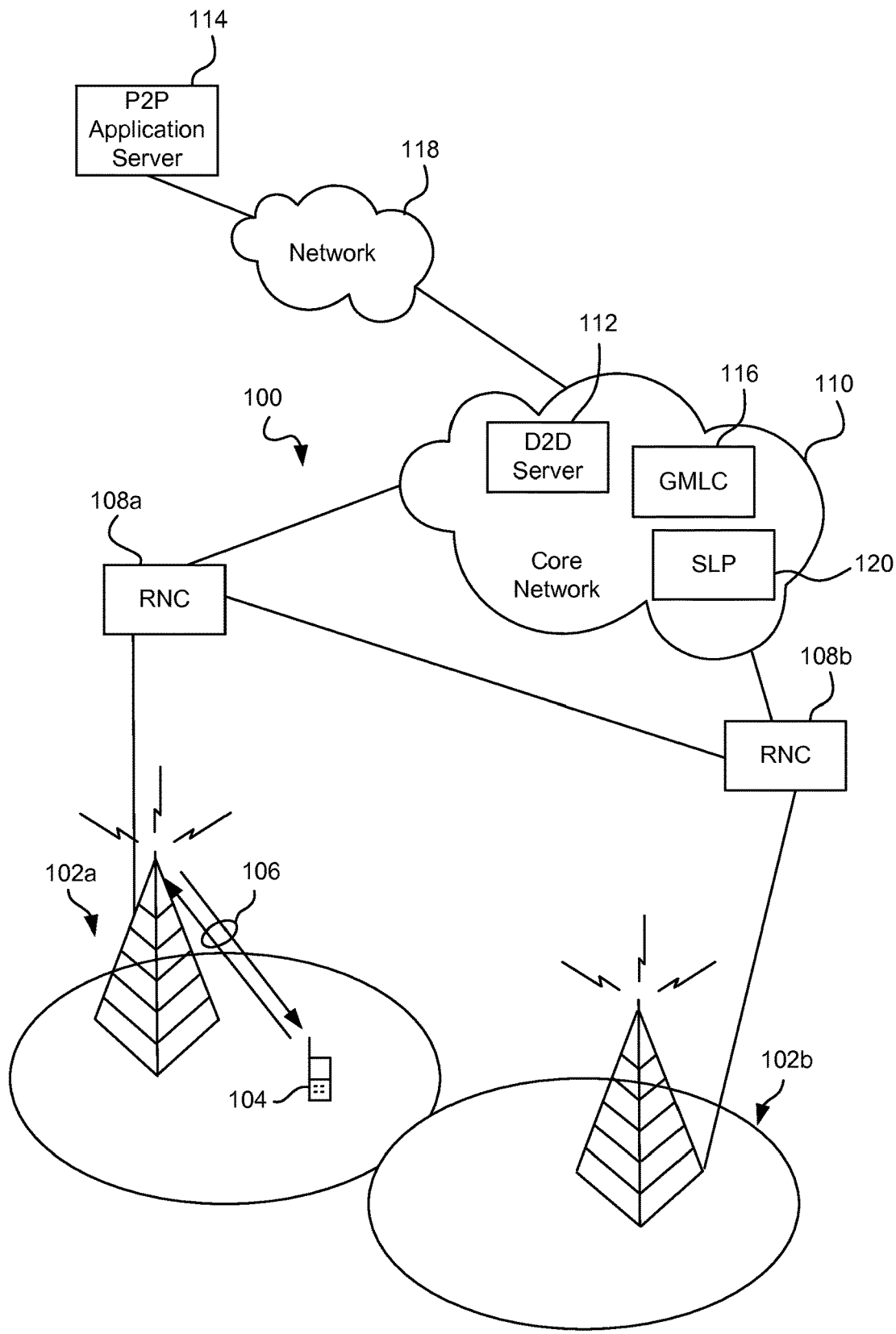
FIG. 1 illustrates an example architecture of a cellular network.

References in this specification to "an embodiment," "one embodiment," or the like, mean that the particular feature, structure or characteristic being described is included in at least one embodiment of the present invention. Occurrences of such phrases in this specification do not necessarily all refer to the same embodiment.

As mentioned above, significant resources may be wasted in a D2D discovery process. Applicants have recognized that network assistance for D2D discovery could significantly reduce the amount of resources needed for D2D discovery. For example, if the network is used to determine whether two devices are in range for D2D communication, the amount of time the devices spend searching for each other can be significantly reduced. The network may also notify the selected device that another device would like to connect, so that both devices are performing discovery at the same time. However, core network infrastructure does not currently provide proximity detection services. The present disclosure proposes systems, methods, and devices for network assisted device discovery and/or proximity detection. In one embodiment, the techniques introduced herein provide for identifying users on an application level and/or user devices on a D2D radio access technology (RAT) level. The techniques introduced herein further provide several schemes for D2D discovery and communication for peer-to-peer (P2P) applications.

Network communications, and particularly wireless communications, often utilize a control plane for controlling or coordinating transmissions between connected devices or radios and a user plane for carrying user data or payload data. The control plane may also be referred to as a control channel, or the like. The user plane may also be referred to as a user channel, data channel, shared data channel, or the like. In one embodiment, a D2D discovery process or proximity detection process may be performed on either the user plane or the control plane. In one embodiment, a network-assisted device discovery procedure retrieves device location information via location services over the control plane, calculates device proximities, and informs relevant devices when they are in proximity (which devices may use for informational purposes only or to trigger direct connection establishment). This procedure may save significant amounts of channel resources and device battery life by avoiding countless direct discovery attempts when devices are not in proximity. Unfortunately, as the number of devices using this service increases, the procedure may begin to overload the control plane, which may be problematic to the operator network. Thus, to allow this procedure to scale, we also introduce a network-assisted device discovery procedure that relies on location services implemented over the user plane.

According to one embodiment, a mobile terminal may be configured to perform a network assisted device discovery method. During the method, the mobile terminal registers with a D2D server. The mobile terminal receives an indication of one or more D2D capable peer mobile terminals from a peer-to-peer application server. The mobile terminal transmits a D2D discovery request to the D2D server for network assistance in discovering a selected mobile terminal of the one or more D2D capable peer mobile terminals. The mobile terminal receives an alert when the selected mobile terminal is within a defined range for discovery. In one embodiment, one or more of registering with the D2D server, receiving the indication of the one or more D2D capable peer mobile terminals, transmitting the D2D discovery request, and receiving the alert occur over a user plane.

On the network side, a D2D server may be configured to perform a device discovery method to assist a mobile terminal. The D2D server registers a plurality of D2D capable peer mobile terminals in response to a registration request from each of the plurality of D2D capable peer mobile terminals. The D2D server receives a D2D discovery request from a first mobile terminal for network assistance in discovering a second mobile terminal. The D2D server transmits a location service request to a location server or entity. For example, the location service or entity may include a Third Generation Partnership Project (3GPP) Secure User Plane Location (SUPL) Location Platform (SLP) or a Gateway Mobile Location Center (GMLC). The D2D server receives a location service response from the location service or entity. The D2D server transmits an alert to the first mobile terminal when the second mobile terminal is within a defined range for discovery. In one embodiment, one or more of registering the plurality of mobile terminals, receiving the D2D discovery request, transmitting the location service request, receiving the location service response, and transmitting the alert occur over a user plane.

FIG. 1 illustrates example architecture of a cellular network 100. The example network 100 includes base stations 102a and 102b and a mobile terminal 104 (also referred to herein as user equipment (UE)). The term "base station" as used herein is a generic term. As will be appreciated by those skilled in the art, in an Evolved Universal Terrestrial Radio Access Network (EUTRAN), such as one used in LTE architecture, the base stations 102a and 102b may be evolved NodeBs (eNodeBs). However, the term "eNodeB" is also broader in some senses than the conventional base station since the eNodeB refers, in general, to a logical node. The term "base station" as used herein is inclusive of a base station, a NodeB, an eNodeB and/or other nodes specific for other architectures.

The UE 104 may use a dedicated channel 106 to communicate with the base station 102a. The base stations 102a and 102b may be connected to corresponding radio network controllers (RNCs) 108a and 108b. Although not shown as such in FIG. 1, it will be appreciated that each RNC 108 may control more than one base station 102. In one embodiment, an RNC 108 may be integrated with a base station 102. The RNC 108 is connected to a core network 110. In the LTE architecture, the core network 110 is an evolved packet core (EPC).

In various embodiments, the core network 110 may include, or be connected to, a D2D server 112, an SLP 120, and/or a GMLC 116. Additionally, in some embodiments, a P2P application server 114 may be coupled with cellular network 100 via a network 118 (e.g., the Internet). The D2D server 112 may be configured to facilitate network assisted D2D device discovery as described below. The P2P application server 114 may be configured to provide P2P content and/or P2P service information. The GMLC 116 may be configured to provide location information for peer UEs configured for D2D communication and may be configured to operate in the control plane. The SLP 120 may be configured to provide location information for peer UEs configured for D2D communication and may be configured to operate in the user plane. While the servers 112 and 114, the GMLC 116, and the SLP 120 are depicted as distinct entities, it should be understood that one or more of these may be hosted on the same physical server and/or be embodied as a single server that provides multiple services.

Figure 2:
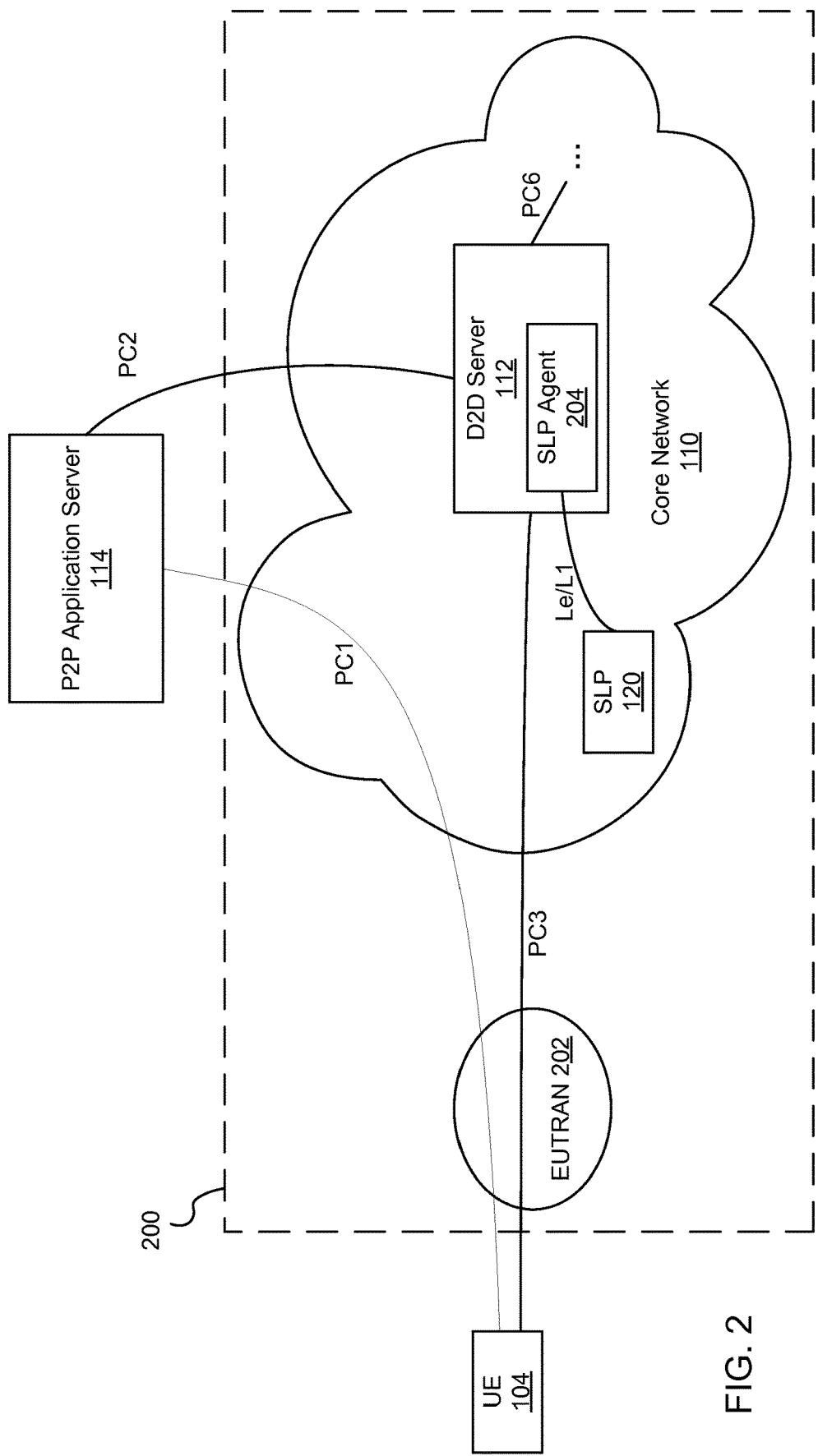
FIG. 2 illustrates example reference points and interfaces for network assisted D2D discovery.

FIG. 2 is a schematic diagram illustrating example reference points and interfaces used for network assisted D2D discovery procedures on a cellular network 200. The network 200 includes a core network 110 that includes, or is in communication with, a D2D server 112 and an SLP 120. The D2D server 112 is in communication with a P2P application server 114 and communicates with a UE 104 via an EUTRAN 202. The D2D server 112 includes an SLP agent 204 for interfacing/communicating with the SLP 120. Some components of the network 200 have been omitted for purposes of clarity.

The P2P application server 114 is in communication with the UE 104 over a PC1 reference point. The P2P application server 114 may include a third-party application server that corresponds to an application used for P2P services. In FIG. 2, the PC1 reference point represents a logical connection between the UE 104 and the P2P application server 114 via an EUTRAN 202, the core network 110, and/or the Internet. In one embodiment, the PC1 reference point may include a logical connection via another access network such as a wireless local area network (WLAN), or the like. The PC1 reference point may be used to provide communications between the UE and the P2P applications server 114. For example, the UE 104 may register with the P2P application server 114, receive an indication of one or more device-to-device capable peer UEs from the P2P application server 114, or perform any other communications with the P2P application server 114 via the PC1 reference point.

The P2P application server 114 is in communication with the D2D server 112 via a PC2 reference point. The PC2 reference point may include a logical connection between the D2D server 112 and the P2P application server 114 via the core network 110 and/or one or more intervening networks (such as the Internet). In one embodiment, the PC2 reference point may allow the D2D server 112 to receive and respond to proximity requests directly from the P2P application server 114 or to send/retrieve P2P or D2D identifiers. Similarly, any other communication between the P2P application server 114 and the D2D server 112 may take place over the PC2 reference point.

The D2D server 112 is in communication with the UE 104 via a PC3 reference point. In FIG. 2, the PC3 reference point represents a logical connection between the UE 104 and the D2D server 112 via an EUTRAN 202, but may also be a connection via other access networks such as a WLAN, or the like. In one embodiment, the PC3 reference point may be used to register the UE 104 with the D2D server 112, send discovery requests, receive alerts, or the like. Similarly, any other communication between the UE 104 and the D2D server 112 may take place over the PC3 reference point.

The Le/L1 interface represents an interface or reference point for communication between the SLP 120 and the SLP agent 204 of the D2D server 112. For example, the SLP agent 204 may allow the D2D server 112 to request and receive location information from the SLP 120 for one or more UEs, such as UE 104 and a UE selected for D2D connection with the UE 104. In one embodiment, the D2D server 112 transmits a location service request to the SLP 120 using the SLP agent 204 and receives a location service response, which may include a location for a UE, over the Le/L1 interface. Similarly, any other communication between the D2D server 112 and the SLP 120 may take place over the Le/L1 interface.

The D2D server 112 may be in communication with one or more other D2D servers 112 via a PC6 reference point. The PC6 reference point may include a logical connection to other D2D servers 112 via the core network 110 and/or any other intervening networks. For example, the PC6 reference point may include a logical connection with a D2D server that corresponds to a UE for which the UE 104 has requested assistance in connecting in a D2D session. The other UE may include a UE connected to the same core network 110, a core network of another network operator, or any other network. For example, the other UE and/or D2D server may be located in a different home public land mobility network (HPLMN) than UE 104. The D2D server 112 may send and/or receive requests for location updates and/or receive location updates from another D2D server. In one embodiment, each of the PC1, PC2, PC3, Le/L1, and PC6 reference points or interfaces run in a user plane of the core network or an evolved packet system (EPS). For example, messages sent over one or more of the PC1, PC2, PC3, Le/L1, and PC6 reference points may include user plane, data channel, and/or shared data channel messages. In one embodiment, the SLP 120 may be replaced by a GMLC 116. In one embodiment, messages sent over one or more of the PC1, PC2, PC3, Le/L1, and PC6 reference points may include control plane and/or control channel messages.

Figure 3:
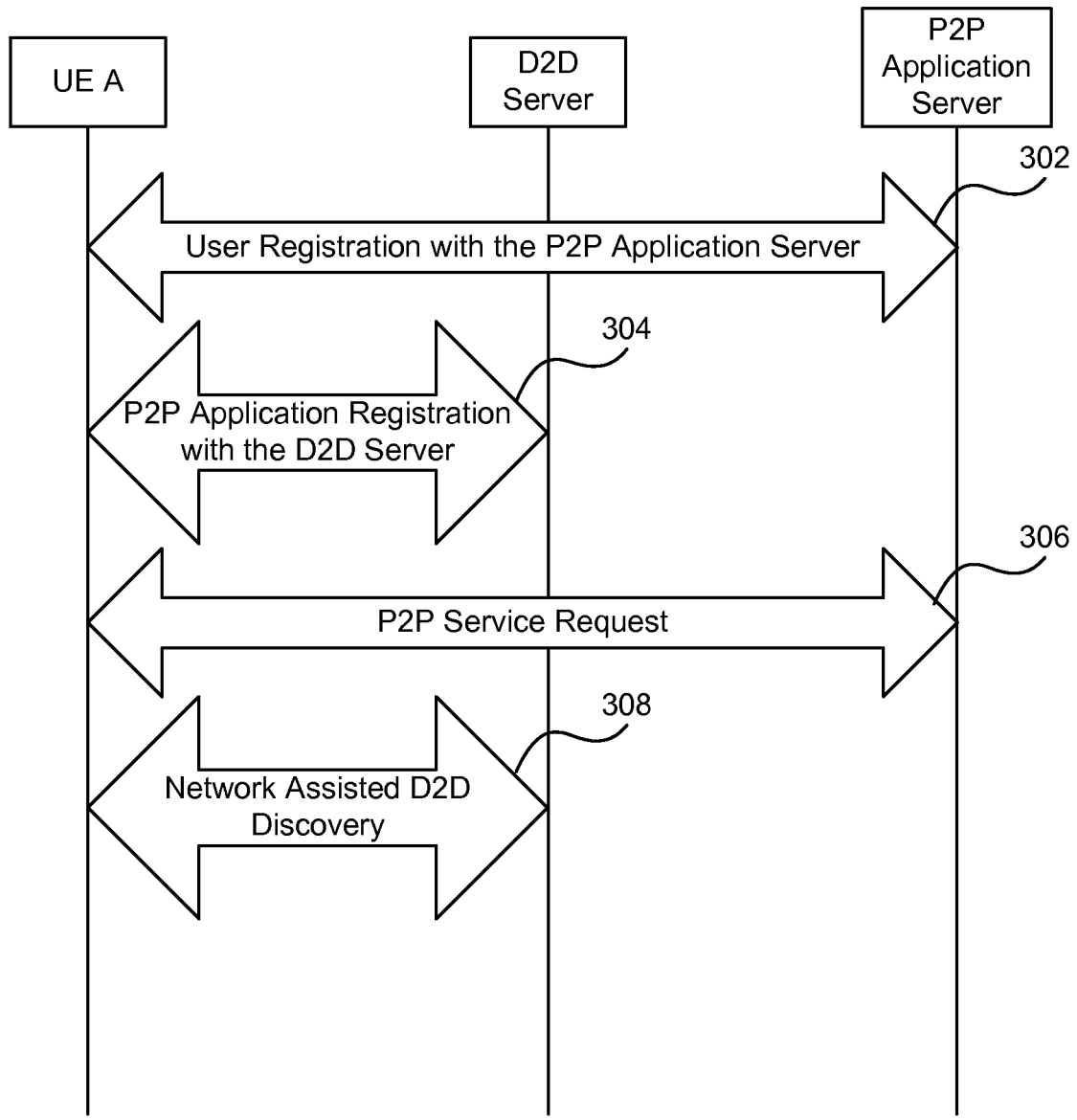
FIG. 3 illustrates an example process for network assisted D2D communication for P2P applications.

FIG. 3 illustrates an example process for network assisted D2D communication for P2P applications. In some embodiments, a user is able to access a P2P application server, such as P2P application server 114, to access P2P content and/or service information. In such embodiments, at 302, a user (using UE A) may register with a P2P application server or servers whose P2P services and or content information the user is interested in.

At 304, the user may register a P2P application with a D2D server. For example, the user, or UE A, may provide the D2D server with a P2P application ID and associated application specific D2D settings (e.g., discovery permissions) for every P2P application the user wants to use in a D2D communication arrangement. In one embodiment, the D2D server maintains a record of the user's registered P2P application IDs associated with a permanent device identifier of the user's UE (e.g., an International Mobile Subscriber Identity (IMSI)).

At 306, the user may request P2P service from the P2P application server. In some embodiments, the user may indicate preferred sources of P2P content, a preferred connectivity method (e.g., a D2D communication arrangement, etc.), or the like. In response to the request, the P2P application server may return a list of peer UEs configured to provide the requested P2P service. In some embodiments, the list of peer UEs may be filtered according to preferences provided by the user.

At 308, the user may request network assisted D2D discovery. In one embodiment, the user may select a UE from the list of peer UEs with which to connect and receive the P2P services. The D2D server may, in response to the request, assist the UEs in establishing a D2D connection.

Figure 4:
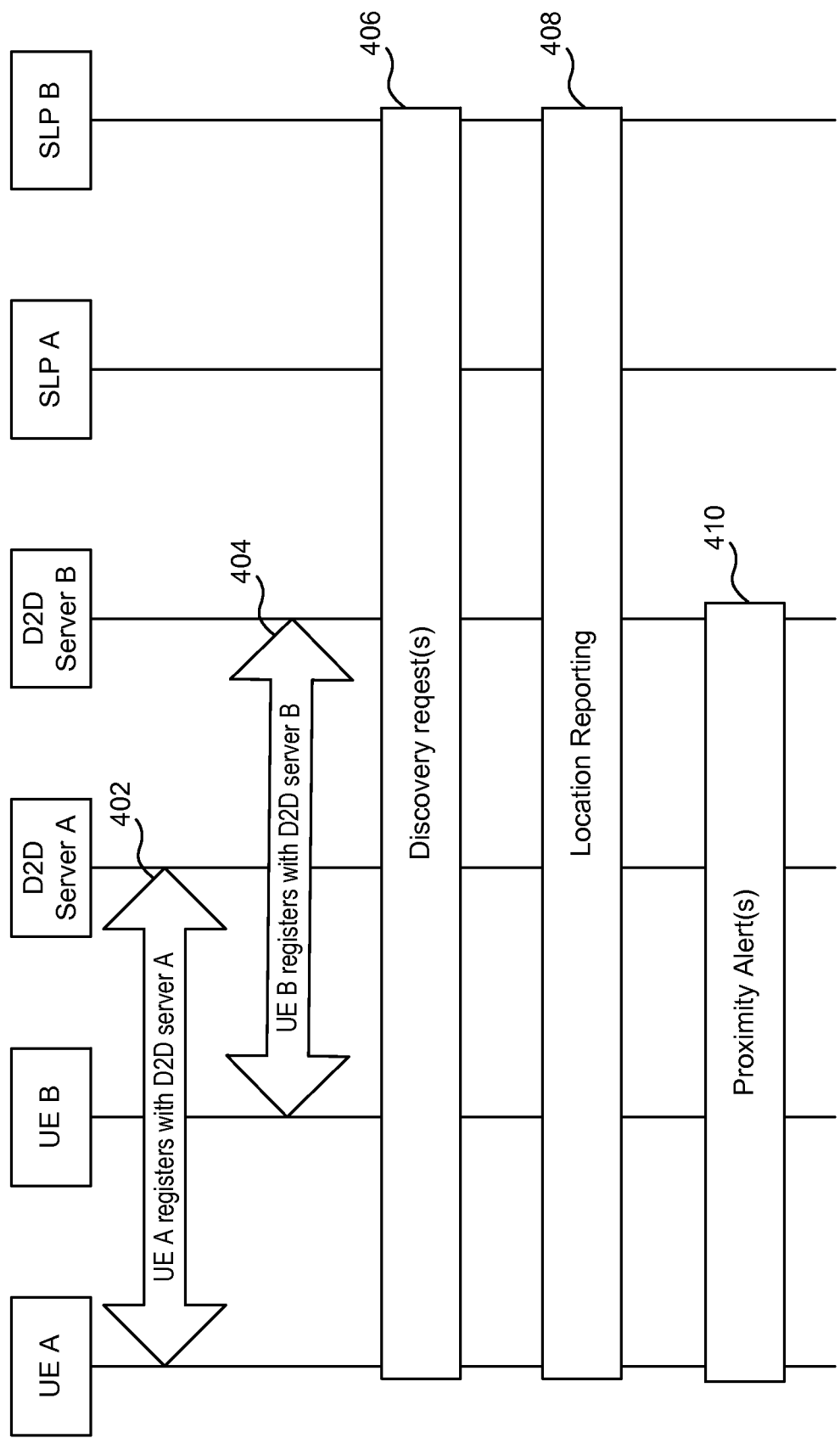
FIG. 4 illustrates another example process for network assisted D2D communication for P2P applications.

FIG. 4 illustrates an example method for assisting a UE to establish a D2D connection. The method is for establishing a D2D connection between devices UE A and UE B which have different D2D servers (D2D server A and D2D server B, respectively) and SLPs (SLP A and SLP B, respectively) and includes D2D request/response and alert procedures. For example, the method may be used when a user of UE A and/or a user of UE B wish to establish a D2D connection. Please note that although the method of FIG. 4 and associated discussion indicates usage of an SLP for determining device location, usage of a GMLC and associated modifications are contemplated as encompassed by this disclosure.

At 402, UE A registers with D2D server A and, at 404, UE B registers with D2D server B. At some point after registration, one or both of UE A and UE B (or the respective users) may desire to establish a D2D connection with each other. At 406, one or both of UE A and UE B may send a discovery request or proximity request for assistance in connecting to the other UE. Also, at 406, one or more of D2D server A and D2D server B may request location updates for both UE A and UE B. For example, in one scenario UE A sends a proximity request to D2D server A requesting that it be alerted for proximity with UE B (possibly indicating a window of time during which the request is valid). In response, D2D server A requests location updates for UE A and UE B. These location updates can be periodic, based on a trigger condition, or a combination of both. To request location updates for UE A, the D2D server A may contacts SLP A. To request location updates for UE B, D2D server A may contact D2D server B, which can in turn send a request to SLP B for location updates for UE B.

At 408, location reporting is performed as requested. For example, SLP A may determine a location for UE A and report the location to D2D server A. D2D server A may then forward the reported location for UE A to D2D server B. Similarly, SLP B may determine a location for UE B and report the location to D2D server B. D2D server B may then forward the reported location for UE B to D2D server A. In one embodiment, the location reporting is performed in accordance with limits or information provided in the discovery requests at 406. For example, location reporting may only be performed during a specified time window, or at the indicated period and/or in response to an indicated trigger condition. In response to location reporting at 408, or whenever the D2D servers receive location updates for the UEs, they may perform proximity analysis to determine whether UE A and UE B are close enough for D2D communication. In one embodiment, only one of the D2D servers performs proximity analysis for a specified pair of UEs.

When a D2D server discovers that UE A and UE B are in proximity, the D2D server sends, at 410, a proximity alert to its corresponding UE. For example, when D2D server A detects that the UE A and UE B are in proximity, it informs UE A that UE B is in proximity. D2D server A may also inform D2D server B of the proximity, which in turn may inform UE B of the detected proximity. Upon receipt of the proximity alerts, UE A and UE B may enter a discovery mode to establish D2D connection.

As discussed above, location updates may be provided based on a trigger condition, a period, or a combination of both. In one embodiment, a D2D server, or other entity may indicate a frequency at which location updates should be received. For example, the D2D server may request location updates every couple of seconds or on any other update period. The update period may be selected to reduce load on the D2D server or other network entities.

In one embodiment, a D2D server may indicate trigger conditions or alert conditions for when location updates should be sent to the D2D server. For example, D2D server A may determine an approximate border area between the UE A and UE B and request that D2D server B (and hence SLP B) and SLP A only send location updates when/if UE B or UE A crosses into or over the border area. Based on these instructions, a reporting entity (such as the D2D server or SLP) may perform a location update and, when a UE has crossed into or over the border area, report the location of the UE to a respective D2D server. In response to the trigger condition being satisfied, a D2D server may then send a modified trigger condition. For example, after a UE has crossed a border area, the D2D server may then request a location update only if/when the UE leaves the border area. The D2D server may then wait to see if the UE leaves the border area or if the other UE enters the border area. Depending on where the UEs move, the D2D server may update the "border area" whenever necessary. This process ends when either the discovery window expires or both UEs enter the border area. If both UEs enter the border area, the D2D server may redefine a smaller border area or simply request periodic location updates for the UEs until the UEs are in proximity.

The examples of FIGS. 3 and 4 above are described in more detail below. Please note that although the following examples may specify usage of an SLP or GMLC for determining device location, modifications to create embodiments with an alternate location service or entity are contemplated as encompassed by this disclosure.

Figure 5:
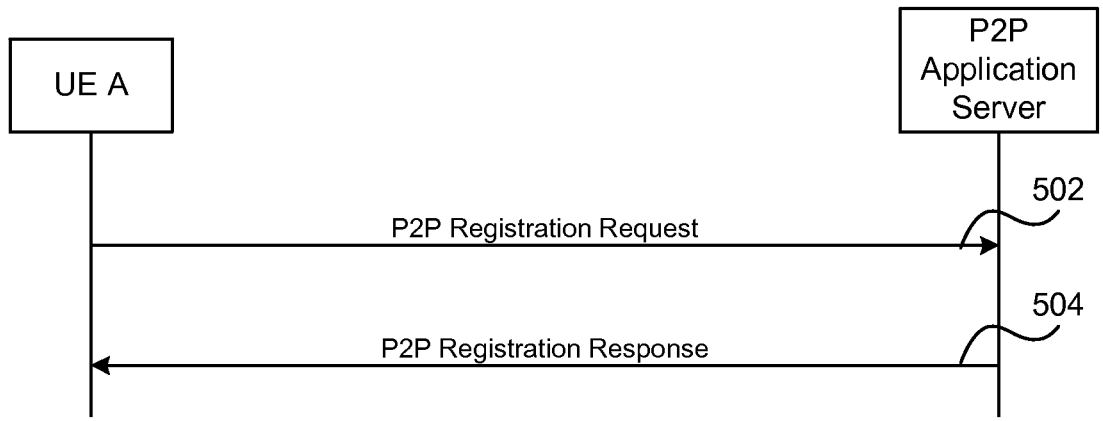
FIG. 5 illustrates an example signaling diagram for user registration with a P2P application server.

FIG. 5 illustrates an example signaling diagram for user registration with a P2P application server. In one embodiment, the signaling may be performed using a PC1 reference point. At 502, a user, perhaps using UE A or using a separate computing device, may send a P2P registration request to the P2P application server. In various embodiments, the P2P registration request may include a user's P2P application ID, a list of P2P application specific services and/or content the user is willing to share and permissions associated with the services and/or content (e.g., what peers can access the content/service), and a D2D server identifier. In one embodiment, the P2P registration request may be manually sent by a user or partially or fully automated by a P2P application running on UE A. In some embodiments, after the user has initially registered with the P2P server the user may later log in to the P2P server and update this information.

At 504, the P2P application server may provide a P2P registration response. For example, the P2P application server may indicate whether the registration was successful.

Figure 6:
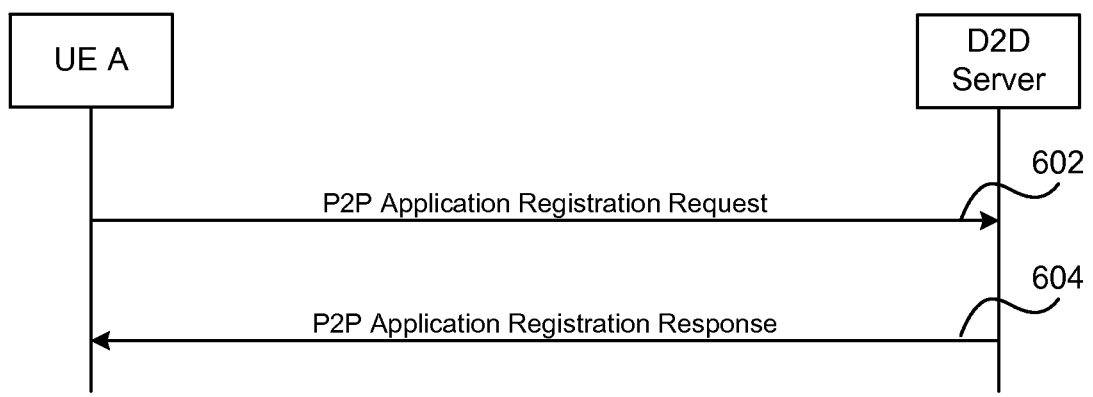
FIG. 6 illustrates an example signaling diagram for P2P application registration with a D2D server.

FIG. 6 illustrates an example signaling diagram for P2P application registration with a D2D server. In one embodiment, the signaling may be performed using a PC3 reference point. In some embodiments, a UE (e.g., UE A) that is subscribed to a network operator's network assisted D2D service may be automatically registered with a D2D server during network registration. During this initial registration, the D2D server may store the D2D capabilities (e.g., WiFi Direct, Bluetooth, LTE-Advanced, or the like), D2D permissions (e.g., open or closed discovery, buddy lists, etc.), and/or a permanent device identifier (e.g., IMSI) for the UE. Initially, P2P application specific information may not be registered with the D2D server.

When a user decides to enable a P2P application to use network assisted D2D communication, at 602, the UE may send a P2P application registration request to the D2D server. The P2P application registration request may include, for example, a P2P application ID, a device ID, and/or any specific D2D permissions. For example, there are generally two types of UEs in D2D communication: open and restricted. A UE that has open access will let any UE discover and connect to it. A UE that has restricted access will provide a list of the UEs or types of UEs that can access it. In various embodiments, the D2D server may associate the UE type with the P2P application ID of a user or a device ID of a UE. In various embodiments, the P2P application request may be sent manually by the user, automatically by the P2P application, or a combination of both.

At 604, the D2D server may provide a P2P application registration response. For example, the D2D server may indicate whether the P2P application registration was successful.

Figure 7:
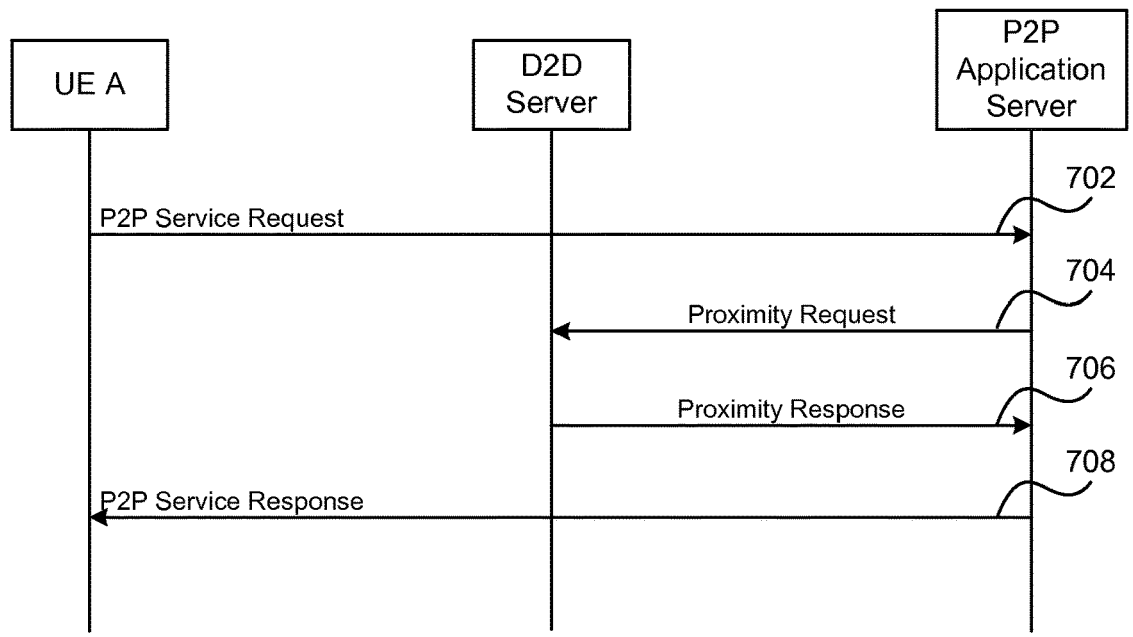
FIG. 7 illustrates an example signaling diagram for a P2P service request where a P2P application server and a D2D server are configured to communicate.

In some embodiments, the P2P application server and the D2D server may be configured to communicate to facilitate the network assisted D2D communication. FIG. 7 illustrates an example signaling diagram for a P2P service request where a P2P application server and a D2D server are configured to communicate.

At 702, UE A transmits a P2P service request to the P2P application server (e.g., in response to a user accessing a P2P application on UE A). The P2P service request may include, for example, an indication of a subset of users (e.g., a buddy list) from whom the user wants to retrieve content or with whom the user wants to engage in a P2P service (e.g., gaming, file sharing, instant messaging, chat, content streaming, etc.). The P2P service request may also include a desired P2P connection arrangement (e.g., D2D, infrastructure, etc.).

In response to the P2P service request, the P2P application server may create a list of potential peer UEs that meet the specifications of the user's request and are willing to share P2P content and/or services with the user. At 704, if D2D is a potential communication mechanism for the peers, the P2P application server sends a proximity request to the D2D server. In an example embodiment, the proximity request may include the user's P2P application ID and the P2P application IDs of the potential peer users. Additionally, the proximity request may include a D2D server identifier for D2D servers associated with the potential peer UEs if they are different from the user's D2D server.

In response to the proximity request, the D2D server checks the D2D capabilities and locations of the potential peer UEs. In one embodiment, the D2D server may contact various other D2D servers associated with the potential peer UEs. At 706, the D2D server may then send a proximity response to the P2P application server. The proximity response may include, for example, the P2P application IDs of potential peer UEs that share a common D2D technology with UE A and are within a defined proximity (e.g., an estimated D2D communication range based on D2D technology) of UE A. In one embodiment, communication at 704 and 706 is performed over a PC2 reference point.

At 708, the P2P server may provide a P2P service response to the user, (e.g., via UE A). In various embodiments, the P2P service response may include a list of the potential peer users (e.g., identified by a P2P application ID). In one embodiment, the list may be filtered, organized, or labeled with additional search filters provided by the user (e.g., buddy lists, P2P connection methods, etc.).

Figure 8:
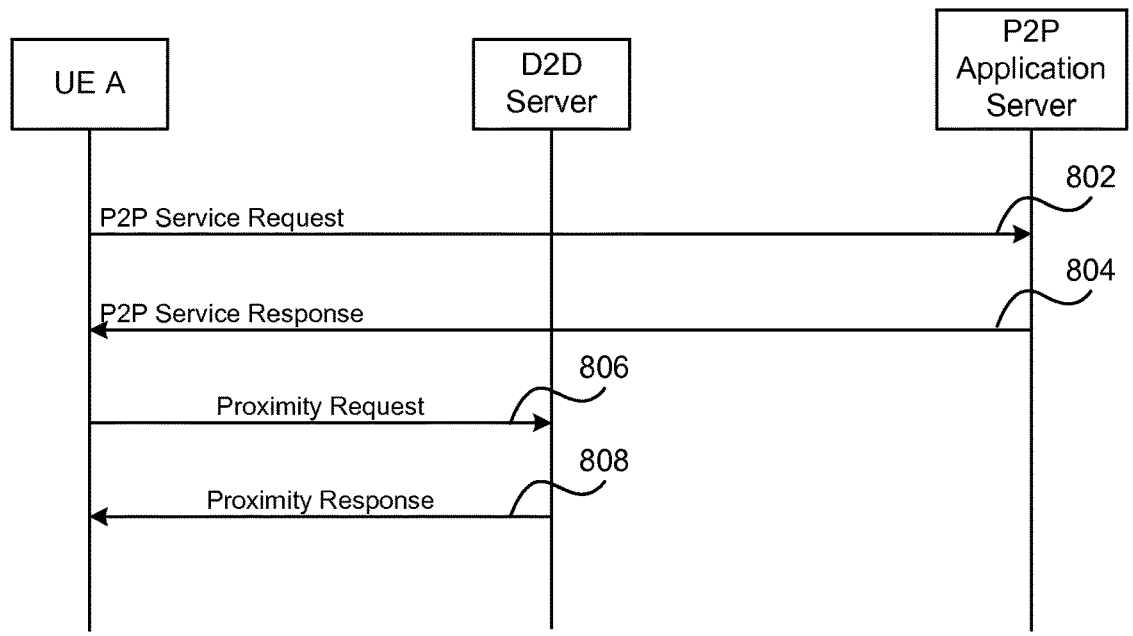
FIG. 8 illustrates an example signaling diagram for a P2P service request where a P2P application server and a D2D server are not configured to communicate.

FIG. 8 illustrates an example signaling diagram for a P2P service request where a P2P application server and a D2D server are not configured to communicate.

At 802, UE A transmits a P2P service request to the P2P application server (e.g., in response to a user accessing a P2P application on UE A). The P2P service request may include, for example, an indication of a subset of users (e.g., a buddy list) with whom the user wants to engage in P2P services. The P2P service request may also include a desired P2P connection arrangement (e.g., D2D, infrastructure, etc.).

At 804, the P2P server may provide a P2P service response to UE A. In various embodiments, the P2P service response may include a list of the potential peer users (e.g., identified by a P2P application ID) and, in some embodiments, a D2D server associated with each D2D capable peer UE. In one embodiment, the list may be filtered, organized, or labeled with additional search filters provided by the user (e.g., buddy lists, P2P connection methods, etc.).

At 806, if there are D2D capable peer UEs in the list provided by the P2P server, the UE may send a proximity request to the D2D server. The proximity request may include a P2P application ID associated with each D2D capable peer UE and, in some embodiments, a D2D server associated with each D2D capable peer UE.

At 808, in response to the proximity request, the D2D server may return a subset of the D2D capable peer UEs that share a common D2D technology with UE A and are within a defined proximity. After receiving the list of potential peer UEs, the user may select one or more of the potential peer UEs with which to connect in a D2D communication arrangement.

Figure 9:
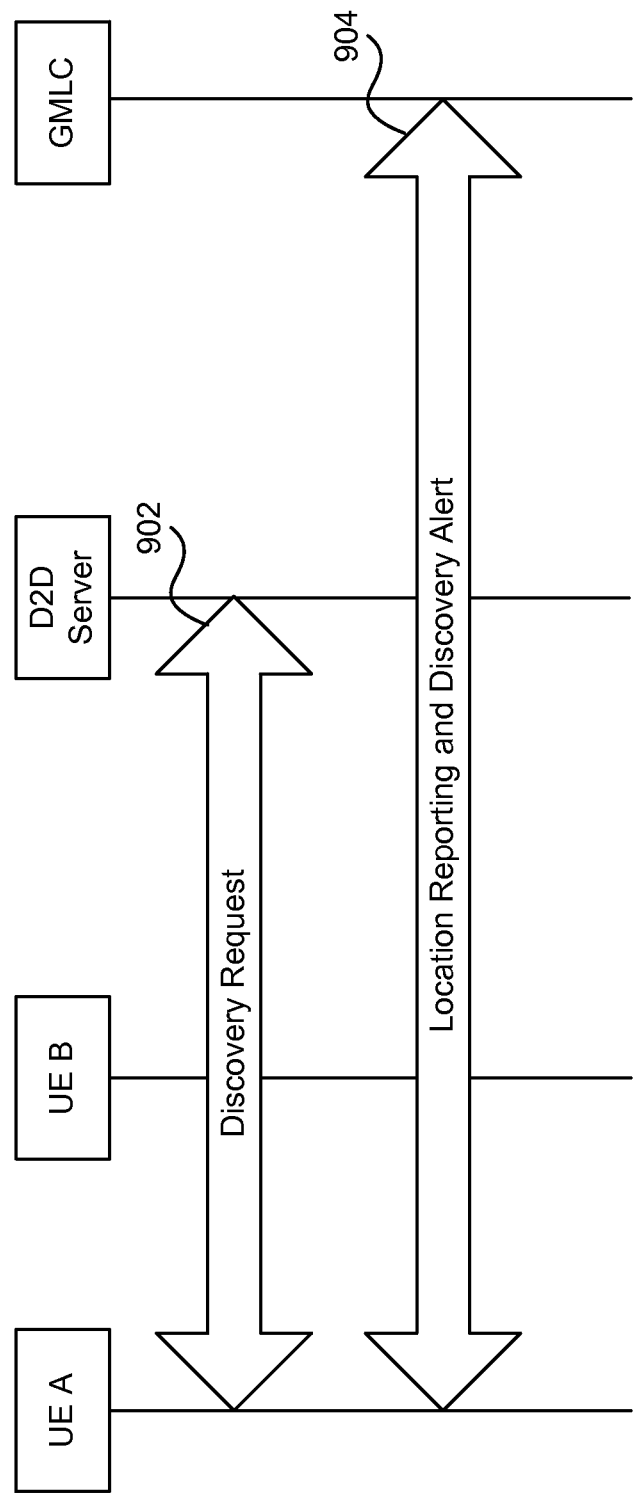
FIG. 9 illustrates an example process for network assisted D2D discovery involving multiple D2D servers.

FIG. 9 illustrates an example process for network assisted D2D discovery involving multiple D2D servers. At 902, The UE may request help from the D2D server to discover (and potentially connect with) the one or more peer UEs during a given time window. If a peer UE has a different D2D server, the D2D server associated with UE A may request location and D2D permission information from the D2D server associated with the peer UE.

At 904, the D2D server associated with UE A and one or more peer UEs may request periodic location reporting for UE A and the one or more peer UEs from a GMLC (or SLP). In one embodiment, if a peer UE is associated with a different D2D server, the location request may be sent from that server to a GMLC. The D2D server may determine, from the location of UE A and the one or more peer UEs, whether the UEs are in proximity for D2D communication. In response to determining that the UEs are within proximity, the D2D server may alert UE A and/or the one or more peer UEs. Similar to the location request, if a peer UE is associated with a different D2D server, the proximity alert may be sent from the corresponding D2D server. In one embodiment, if the UE has requested network assistance with D2D connection establishment post discovery, the D2D server may provide assistance as described below.

Figure 10:
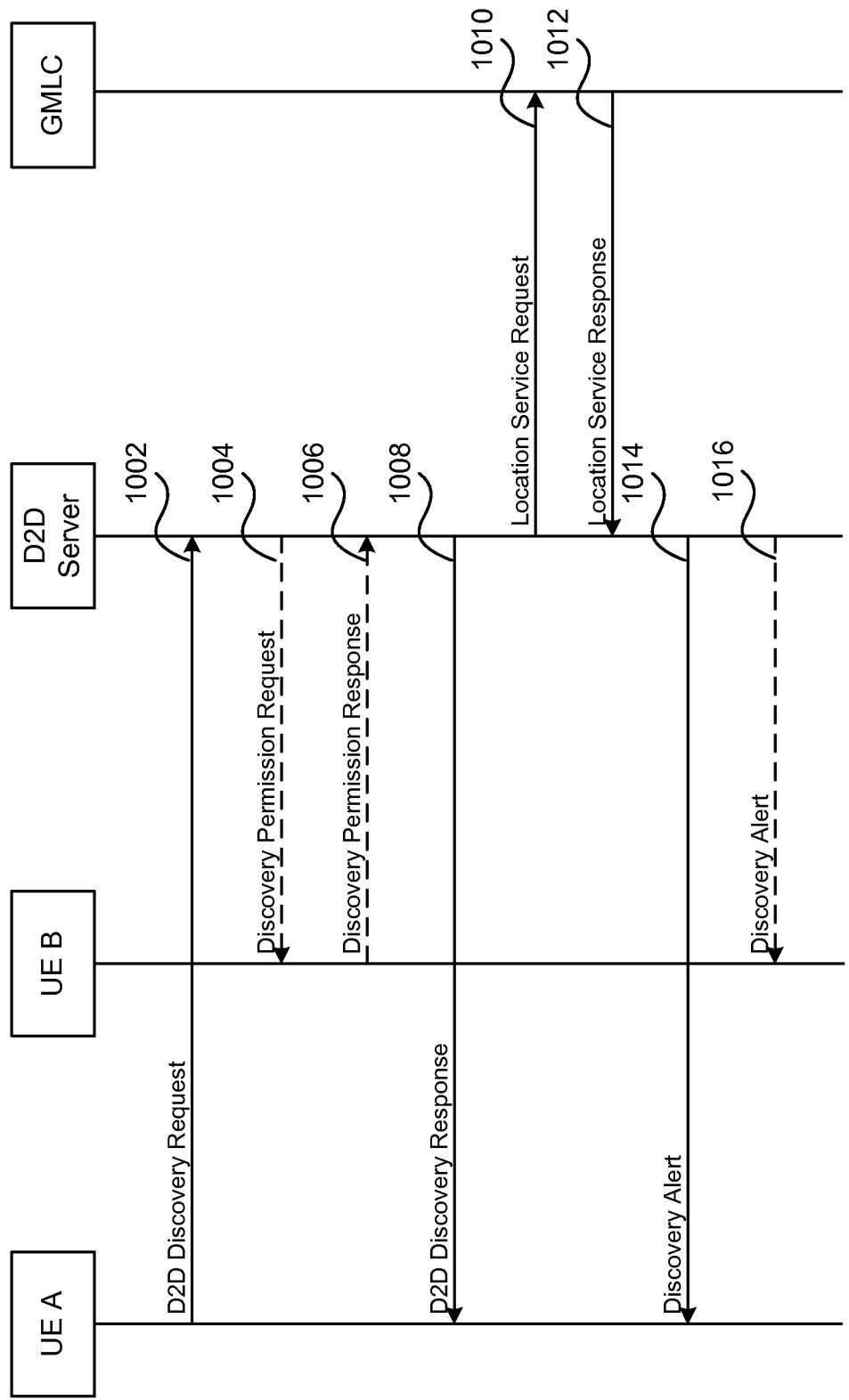
FIG. 10 illustrates an example signaling diagram for network assisted D2D discovery involving a single D2D server.

FIG. 10 illustrates an example signaling diagram for network assisted D2D discovery involving a single D2D server. At 1002, UE A may send a D2D discovery request to the D2D server. In some embodiments, the D2D discovery request may include a P2P application ID associated with one or more peer UEs and in some embodiments a D2D server associated with each D2D capable peer UE. For example, in situations where the D2D servers can't talk to the P2P servers, the D2D servers may be given the D2D server names associated with the peer UEs. Alternatively, the D2D server may ping every D2D server across all networks to determine what D2D server manages a specific peer UE. It should be noted that a UE may request help discovering multiple peer UEs in the same message. The D2D discovery request may also include an indication that the UE wishes to engage in D2D communication after being alerted to the proximity of one or more peer UEs.

If UE A does not have permission to discover a peer UE, the D2D server may request permission in real time (at 1004) or simply return a rejection notice. The discovery permission request may include, for example, UE A's P2P application ID. At 1006, the peer UE may respond with an indication of whether permission is granted and if there is a time limit on the permission.

At 1008, the D2D server sends a D2D discovery response to UE A indicating whether UE A has permission to discover any of the one or more requested peer UEs.

At 1010, the D2D server may request location service from a GMLC. The location service request may include a permanent identifier associated with UE A (e.g., IMSI), a permanent identifier associated with one or more peer UEs, a time period for discovery, and/or the like.

At 1012, the GMLC may provide a location service response including UE A's location and a location of each of the one or more peer UEs. In one embodiment, the GMLC may provide additional location service responses to the D2D server periodically, based on triggers, thresholds, or any time the location of a UE changes.

In one embodiment, if UE A requested only a discovery alert when one or more peer UEs are within a D2D discovery range, the D2D server may send, at 1014, a discovery alert to UE A. The discovery alert may include the application ID for the one or more peer UEs.

In another embodiment, if UE A has requested network assisted D2D connection establishment, the D2D server may send, at 1014 and 1016, a discovery alert message to each UE to be involved in the D2D communication. In some embodiments, the discovery alert message may include an application ID (for user recognition) and a permanent or temporary link layer ID (for connection establishment) for each of the other UEs to be involved in the D2D communication. In one embodiment, the temporary link layer ID may be assigned by the D2D server. The discovery alert message may also contain other assistance information for the D2D connection establishment process such as timing, D2D roles (e.g., in WiFi Direct, one UE is the group owner while other UEs are clients), etc.

In some embodiments, a P2P application may not be associated with, or may not communicate with, a P2P application server. However, the P2P application may nonetheless be capable of network assisted D2D communication.

For each application that a user wants to enable with network-assisted D2D, the UE may register a P2P application ID and application-specific D2D preferences (e.g., discovery permissions) with a D2D server. The D2D server may know the UE's device identifier (e.g., IMSI), and may map the UE's device identifier with the user's P2P application IDs.

The user may request assistance in discovering (and potentially establishing a D2D connection with) a specific user by sending a D2D discovery request to the D2D server that includes the desired user's P2P application ID and D2D server name (if the desired user has a separate D2D server). If the user/UE has no information about the desired user's D2D capabilities and/or D2D server name, the D2D server may resolve the D2D server name based on the P2P application ID (e.g., by inquiring with all local D2D servers).

If the desired user is available for D2D communication with the requesting user, the D2D server may assist the user in the discovering and potentially connecting directly with the desired user; otherwise, the D2D server may respond with a failure notice.

In some embodiments, the GMLC may be replaced by an SLP in the processes of FIGS. 9 and 10 for discovery assistance performed over the user plane.

Figure 11:
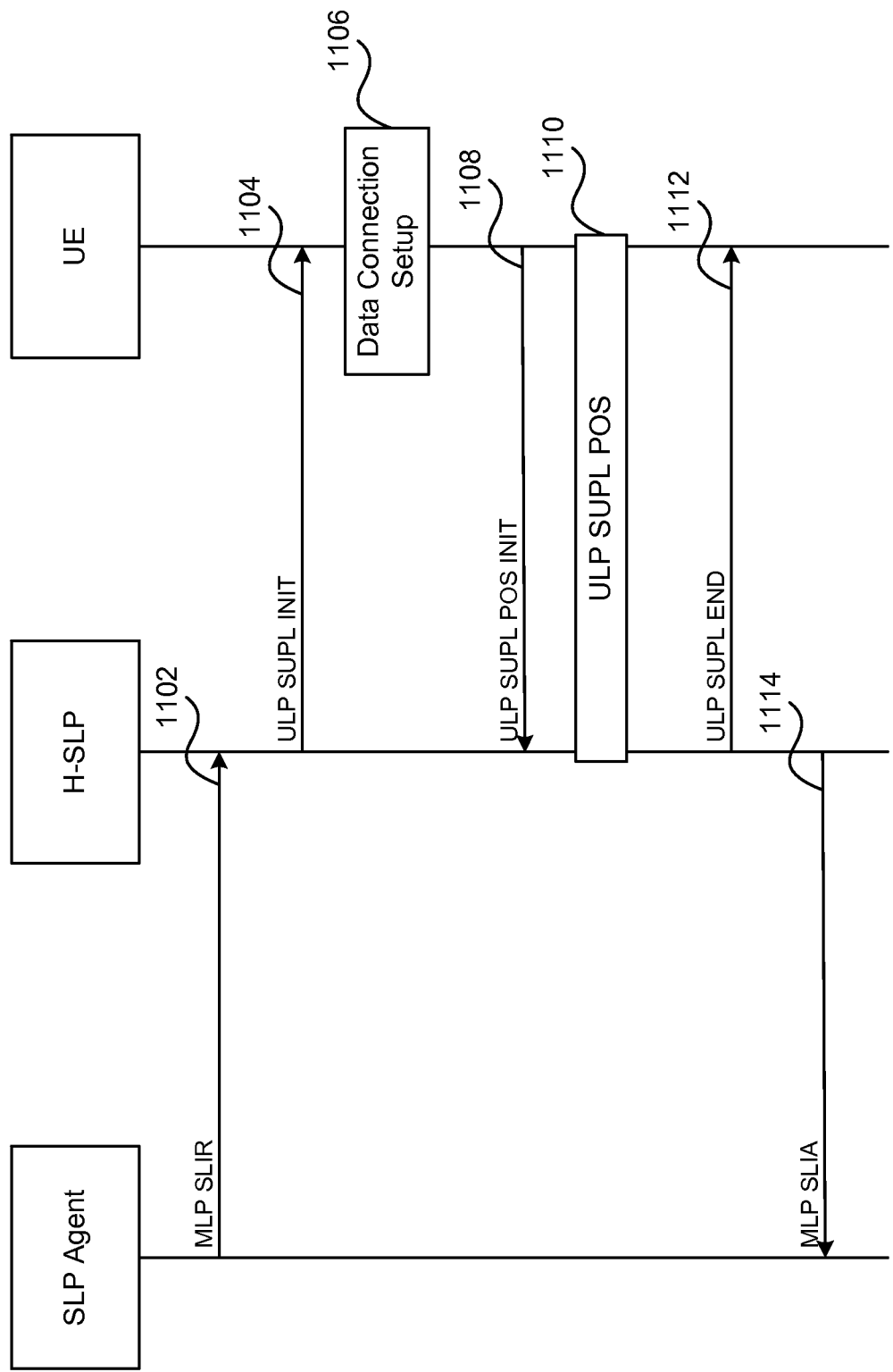
FIG. 11 illustrates an example signaling diagram for obtaining a device location update.

FIG. 11 illustrates one possible signal flow for device location update using SUPL architecture. This example is for a network initiated, immediate location request in proxy mode from the Secure User Plane Location Architecture defined by the Open Mobile Alliance approved version 2.0, 17 Apr. 2012 (OMA-AD-SUPL-V2_0-20120417-A), which is herein incorporated by reference in its entirety. See OMA-AD-SUPL-V2_0-20120417-A, for example, at FIG. 9. Signal flows may vary somewhat between embodiments depending on the types of SUPL location updates used (periodic, trigger-based, or a combination thereof). In some cases, the signal flows begin with a location request from an SLP agent (such as SLP agent 204 or a UE) to an SLP 120.

The signal flow illustrates communication between an SLP agent (also known as an SUPL agent), a home SLP (H-SLP), and a UE. The SLP agent may include, for example, an SLP agent included within a D2D server or other device. The H-SLP may include an SLP within an HPLMN for the D2D server hosting the SLP agent. The UE may include any mobile terminal configured to connect to the HPLMN.

In the signal flow, the SLP Agent issues, at 1102, a mobile location protocol (MLP) standard location immediate request (SLIR) message to the H-SLP. At 1104, the H-SLP initiates a SUPL session with the UE by sending a user plane location protocol (ULP) SUPL initiation (INIT) message. The message contains a requested positioning method and a SUPL positioning center (SPC) address. When the ULP SUPL INIT is received by the UE, it establishes a secure connection to the H-SLP at 1106. The UE establishes, at 1108, a secure connection to the H-SLP and sends a ULP SUPL positioning (POS) INIT message to start a positioning session with the H-SLP. The message contains the UE capabilities. The H-SLP then determines, at 1110, the positioning method and exchanges several successive ULP SUPL POS messages, containing a used positioning protocol (i.e., radio resource location services (LCS) protocol (RRLP), radio resource control (RRC), and/or telecommunications industry association 801 positioning service (TIA-801)), as needed to determine the position of the UE. When the position calculation is complete the H-SLP sends, at 1112, an ULP SUPL END message to the UE informing it that the SUPL session is finished. The UE then releases the secure connection to the H-SLP. The H-SLP sends the position estimate back at 1114 to the SLP Agent in a mobile location platform (MLP) standard location immediate answer (SLIA) message.

Figure 12:
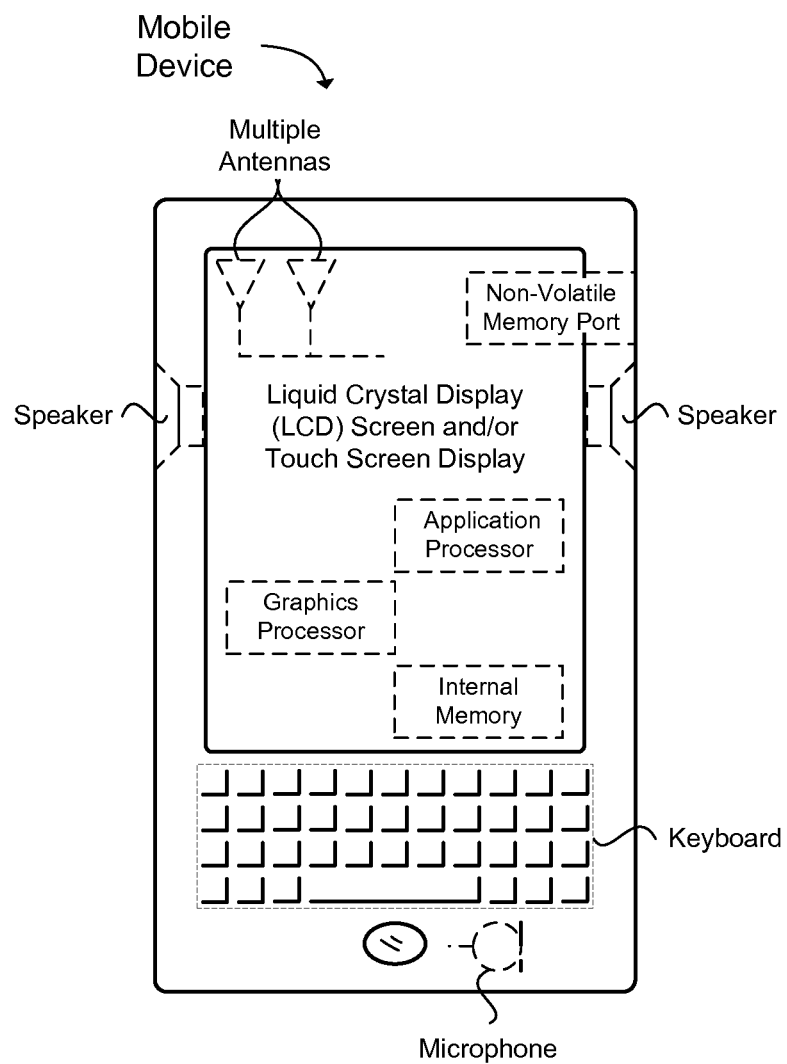
FIG. 12 illustrates an example mobile device.

FIG. 12 illustrates an example mobile device, such as a user equipment (UE), a mobile station (MS), a mobile wireless device, a mobile communication device, a tablet, a handset, or other type of mobile wireless device. The mobile device can include one or more antennas configured to communicate with a transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 12 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments.

Example 1 is a UE configured to use D2D communication for P2P applications. The UE includes a transceiver configured to transmit and receive signals and a processing unit. The processing unit is configured to cause the UE to register with a D2D server. The processing unit is configured receive an indication of one or more D2D capable peer UEs from a P2P application server. The processing unit is configured to cause the UE to transmit a D2D discovery request to the D2D server for network assistance in discovering a selected UE of the one or more D2D capable peer UEs. The processing unit is also configured to cause the UE to receive an alert when the selected UE is within a defined range for discovery. Transmitting the D2D discovery request and receiving the alert comprises transmitting and receiving over a user plane.

In Example 2, the processing unit of Example 1 is further configured to cause the UE to transmit a proximity request to the D2D server and receive an indication of one or more D2D capable peer UEs within a defined range.

In Example 3, the processing unit of any of Examples 1-2 is further configured to cause the UE to transmit, in response to a user request to register with the P2P application server, a P2P registration request In Example 4, the P2P registration request of any of Examples 1-3 includes at least one of an application layer identifier for the user, an indication of offered P2P services, content, or permissions, and a D2D server name.

In Example 5, registering with the D2D server in any of Examples 1-4 includes transmitting a D2D registration request.

In Example 6, the D2D registration request of any of Examples 1-5 includes at least one of one or more application layer identifiers for a user associated with the UE, D2D permissions, D2D capabilities, and a device identifier.

In Example 7, the D2D discovery request of any of Examples 1-6 includes at least one of an application layer identifier for a user associated with the selected UE, an identifier for a D2D-server associated with the selected UE, and a time window for discovery.

In Example 8, the processing unit of any of Examples 1-7 is further configured to cause the UE to receive a discovery permission request from the D2D server. The discovery permission request includes an application layer identifier for a peer UE requesting a D2D connection with the UE. The processing unit is further configured to, and in response to the discovery permission request, provide a discovery permission response.

Example 9 is a D2D server for assisting in device discovery in a D2D communication arrangement for P2P applications. The D2D server includes a processing unit and a memory coupled with the processing unit. The memory stores instructions, which when executed by the processing unit, cause the D2D server to register a plurality of D2D capable peer mobile terminals in response to a registration request from each of the plurality of D2D capable peer mobile terminals. The instructions further cause the D2D server to receive, over a data channel, a D2D discovery request from a first mobile terminal for network assistance in discovering a second mobile terminal. The instructions further cause the D2D server to transmit a location service request to a 3GPP SLP. The instructions further cause the D2D server to receive a location service response from the SLP. The instructions further cause the D2D server to transmit, over the data channel, to the first mobile terminal an alert when the second mobile terminal is within a defined range for discovery.

In Example 10, the registration request from each of the plurality of D2D capable peer mobile terminals of Example 9 includes at least one of an application layer identifier, D2D permissions, D2D capabilities, and a device identifier.

In Example 11, the instructions of any of Examples 9-10 further cause the D2D server to provide a list of mobile terminals configured for D2D communication in proximity to the first mobile terminal in response to a proximity request.

In Example 12, the proximity request of any of Examples 9-11 is received from the first mobile terminal.

In Example 13, the proximity request of any of Examples 9-12 is received from a P2P application server from which the first mobile terminal has requested P2P services.

In Example 14, the instructions of any of Examples 9-13 further cause the D2D server to transmit a discovery permission request to the second mobile terminal in response to receiving the D2D discovery request.

In Example 15, the location service request of any of Examples 9-14 includes a device identifier for the first mobile terminal.

In Example 16, the instructions of any of Examples 9-15 further cause the D2D server to transmit an alert to the second mobile terminal when the first mobile terminal is within a defined range for discovery.

In Example 17, transmitting the alert of Examples 16 to the second mobile terminal includes transmitting the alert to a D2D server corresponding to the second mobile terminal.

In Example 18, transmitting the location service request in any of Examples 9-17 includes transmitting a location service request comprising one or more alert conditions.

In Example 19, the instructions of any of Examples 9-18 further include determining a border area for triggering location reporting, wherein the one or more alert conditions comprises a definition of the border area as criteria for reporting mobile terminal locations.

Example 20 is a non-transitory computer readable storage medium having instructions stored thereon, which when executed by a processor, cause the processor to perform a method for network assisted discovery of a peer user equipment (UE) in a D2D communication arrangement for a P2P application. The method includes communicating over a control channel to configure wireless communication of a first UE. The method includes performing, at the first UE, assisted D2D discovery over a shared channel. The method includes transmitting, by a first UE, a P2P service request to a first server. The method includes receiving a P2P application identifier of at least one D2D capable peer UE from the first server. The method includes transmitting a request to a second server for network assistance in discovering a selected UE of the at least one D2D capable peer UE. The method also includes receiving an alert from the second server when the selected UE is within a defined range for discovery.

In Example 21, the first server of Example 20 includes a P2P application server and the second server comprises a D2D server.

In Example 22, the first server and the second server of any of Examples 20-21 are hosted on a single physical server.

In Example 23 the method of any of Examples 20-22 further includes registering, with the first server, one or more of an application layer identifier of the first UE, an indication of P2P services, content, or permissions offered by the first UE, and an indication of a D2D server associated with the first UE.

Example 24 is a method for D2D communication for P2P applications. The method includes registering with a D2D server. The method includes receiving an indication of one or more D2D capable peer UEs from a P2P application server. The method includes transmitting a D2D discovery request to the D2D server for network assistance in discovering a selected UE of the one or more D2D capable peer UEs. The method includes receiving an alert when the selected UE is within a defined range for discovery. Transmitting the D2D discovery request and receiving the alert includes transmitting and receiving over a user plane.

In Example 25, the method of Example 24 includes transmitting a proximity request to the D2D server and receive an indication of one or more D2D capable peer UEs within a defined range.

In Example 26, the method unit of any of Examples 24-25 further includes transmitting, in response to a user request to register with the P2P application server, a P2P registration request In Example 27, the P2P registration request of any of Examples 24-26 includes at least one of an application layer identifier for the user, an indication of offered P2P services, content, or permissions, and a D2D server name.

In Example 28, registering with the D2D server in any of Examples 24-27 includes transmitting a D2D registration request.

In Example 29, the D2D registration request of any of Examples 24-28 includes at least one of one or more application layer identifiers for a user associated with the UE, D2D permissions, D2D capabilities, and a device identifier.

In Example 30, the D2D discovery request of any of Examples 24-29 includes at least one of an application layer identifier for a user associated with the selected UE, an identifier for a D2D-server associated with the selected UE, and a time window for discovery.

In Example 31, the method of any of Examples 24-30 further includes receiving a discovery permission request from the D2D server. The discovery permission request includes an application layer identifier for a peer UE requesting a D2D connection with the UE. The method further includes, and in response to the discovery permission request, providing a discovery permission response.

Example 32 is a method for assisting in device discovery in a D2D communication arrangement for P2P applications. The method includes registering a plurality of D2D capable peer mobile terminals in response to a registration request from each of the plurality of D2D capable peer mobile terminals. The method includes receiving, over a data channel, a D2D discovery request from a first mobile terminal for network assistance in discovering a second mobile terminal. The method includes transmitting a location service request to a 3GPP SLP. The method includes receiving a location service response from the SLP. The method includes transmitting, over the data channel, to the first mobile terminal an alert when the second mobile terminal is within a defined range for discovery.

In Example 33, the registration request from each of the plurality of D2D capable peer mobile terminals of Example 32 includes at least one of an application layer identifier, D2D permissions, D2D capabilities, and a device identifier.

In Example 34, the method of any of Examples 32-33 further includes providing a list of mobile terminals configured for D2D communication in proximity to the first mobile terminal in response to a proximity request.

In Example 35, the proximity request of any of Examples 32-34 is received from the first mobile terminal.

In Example 36, the proximity request of any of Examples 32-35 is received from a P2P application server from which the first mobile terminal has requested P2P services.

In Example 37, the method any of Examples 32-36 further include transmitting a discovery permission request to the second mobile terminal in response to receiving the D2D discovery request.

In Example 38, the location service request of an of Examples 32-37 includes a device identifier for the first mobile terminal.

In Example 39, the method of any of Examples 32-38 further includes transmitting an alert to the second mobile terminal when the first mobile terminal is within a defined range for discovery.

In Example 40, transmitting the alert of Example 39 to the second mobile terminal includes transmitting the alert to a D2D server corresponding to the second mobile terminal.

In Example 41, transmitting the location service request in any of Examples 32-40 includes transmitting a location service request comprising one or more alert conditions.

In Example 42, the method of any of Examples 32-42 further includes determining a border area for triggering location reporting, wherein the one or more alert conditions comprises a definition of the border area as criteria for reporting mobile terminal locations.

Example 43 is a method for network assisted discovery of a peer user equipment (UE) in a D2D communication arrangement for a P2P application. The method includes communicating over a control channel to configure wireless communication of a first UE. The method includes performing, at the first UE, assisted D2D discovery over a shared channel comprising. The method includes transmitting, by a first UE, a P2P service request to a first server. The method includes receiving a P2P application identifier of at least one D2D capable peer UE from the first server. The method includes transmitting a request to a second server for network assistance in discovering a selected UE of the at least one D2D capable peer UE. The method also includes receiving an alert from the second server when the selected UE is within a defined range for discovery.

In Example 44, the first server of Example 43 includes a P2P application server and the second server comprises a D2D server.

In Example 45, the first server and the second server of any of Examples 43-44 are hosted on a single physical server.

In Example 46 the method of any of Examples 43-45 further includes registering, with the first server, one or more of an application layer identifier of the first UE, an indication of P2P services, content, or permissions offered by the first UE, and an indication of a D2D server associated with the first UE.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

The techniques introduced above can be implemented by programmable circuitry programmed or configured by software and/or firmware, or they can be implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced herein may be stored on a machine-readable storage medium and may be executed by one or more general-purpose or special-purpose programmable microprocessors. A "machine-readable medium," as the term is used herein, includes any mechanism that can store information in a form that is accessible by a machine (a machine may be, for example, a computer, network device, cellular phone, PDA, manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic," as used herein, can include, for example, special-purpose hardwired circuitry, software and/or firmware in conjunction with programmable circuitry, or a combination thereof.

Although the present disclosure includes reference to specific example embodiments, it will be recognized that the claims are not limited to the embodiments described, but can be practiced with modification and alteration within the spirit and scope of the appended claims. Accordingly, the specification and drawings are to be regarded in an illustrative sense rather than a restrictive sense.

What is claimed is:

1. At least one non-transitory computer-readable storage medium having stored thereon instructions that, when executed by one or more processors of a server, cause the one or more processors to perform operations comprising:
receiving, from a first user equipment (UE), an application registration request for an application;
processing a proximity request from the first user UE for network assistance to discover a second UE, wherein the proximity request comprises an application identifier corresponding to the application and an application layer identifier for a user associated with the second UE;
sending a location service request to a Secure User Plane Location (SUPL) Location Platform (SLP) in response to the proximity request from the first UE for network assistance to discover the second UE;

receiving a location service response from the SLP;
transmitting a proximity alert to the first UE when the second UE is within a defined range for discovery by the first UE, wherein the proximity alert comprises assistance information to assist discovery of the second UE, wherein the assistance information comprises a designated peer-to-peer group owner, and a permanent link-layer identifier corresponding to the second UE.

2. The at least one non-transitory computer-readable storage medium of claim 1, wherein the instructions further cause the one or more processors to request location updates for the second UE from a second server corresponding to the second UE.

3. The at least one non-transitory computer-readable storage medium of claim 2, wherein the instructions further cause the one or more processors to receive an indication of the second UE's location from the second server corresponding to the second UE.

4. The at least one non-transitory computer-readable storage medium of claim 1, wherein the assistance information further comprises a temporary link-layer identifier corresponding to the second UE.

5. The at least one non-transitory computer-readable storage medium of claim 1, wherein the proximity request further comprises a time window for discovery.

6. A user equipment (UE) configured to use direct communication for peer-to-peer applications, comprising:
a transceiver configured to transmit and receive signals; and
a processing unit configured to cause the UE to:
register an application with a peer-to-peer application server, wherein the processing unit is configured to cause the UE to transmit an application registration request to register the application with the peer-to-peer application server;
transmit, with the transceiver, a proximity request to a mobile communications network for network assistance to discover a peer UE, wherein the proximity request comprises an application identifier corresponding to the application and an application layer identifier for a user associated with the peer UE;
report a location of the UE to a Secure User Plane Location (SUPL) Location Platform (SLP); and
receive a proximity alert from the mobile communications network, wherein the mobile communications network sends the proximity alert when the mobile communications network determines that the peer UE is within a defined range for discovery based on a location service response from the SLP, wherein the proximity alert comprises assistance information to assist discovery of the peer UE, wherein the processing unit is further configured to cause the UE to discover the peer UE based on the assistance information, wherein the assistance information comprises a designated peer-to-peer group owner for direct communications, and a permanent link-layer identifier corresponding to the peer UE.

7. The UE of claim 6, wherein the UE and the peer UE are registered with different servers for proximity services.

8. The UE of claim 6, wherein the processing unit is further configured to cause the UE to send a registration request to a first mobile communications network to register the first UE for proximity services.

9. The UE of claim 8, wherein to send the registration request, the processing unit is configured to send a link-layer identifier for the UE for direct discovery and communication.

10. The UE of claim 6, wherein the application registration request comprises the application identifier and an identifier corresponding to the UE.

11. The UE of claim 6, wherein the proximity request further comprises one or more of:
an identifier corresponding to the peer UE;
a time window for the proximity request; and
a discovery range.

12. The UE of claim 6, wherein the assistance information further comprises:
a temporary link-layer identifier for the peer UE.

13. At least one non-transitory computer-readable storage medium having stored thereon instructions that, when executed by one or more processors of a user equipment (UE), cause the one or more processors to perform operations comprising:
generating an application registration request for a server, wherein the application registration request is for registering an application with a peer-to-peer application server;
generating a proximity request for the server, wherein the proximity request comprises an application identifier corresponding to the application and an application layer identifier for a user associated with a peer UE;
reporting a location of the UE to a Secure User Plane Location (SUPL) Location Platform (SLP); and
decoding a proximity alert from the server, wherein the proximity alert is sent when the server detects that the peer UE is within a defined range for discovery based on a location service response from the SLP, wherein the proximity alert comprises assistance information to assist discovery of the peer UE, wherein the instructions further cause the one or more processors to discover the peer UE based on the assistance information, wherein the assistance information comprises a designated peer-to-peer group owner for direct communications, and a permanent link-layer identifier corresponding to the peer UE.

14. The at least one non-transitory computer-readable storage medium of claim 13, wherein the UE and the peer UE are registered with different servers for proximity services.

15. The at least one non-transitory computer-readable storage medium of claim 13, wherein the instructions further cause the one or more processors to prepare a registration request to send to the server to register the first UE for proximity services.

16. The at least one non-transitory computer-readable storage medium of claim 15, wherein the registration request comprises a link-layer identifier for the UE for direct discovery and communication.

17. The at least one non-transitory computer-readable storage medium of claim 13, wherein the application registration request comprises the application identifier and an identifier corresponding to the UE.

18. The at least one non-transitory computer-readable storage medium of claim 13, wherein the proximity request further comprises one or more of:
an identifier corresponding to the peer UE;
a time window for the proximity request; and
a discovery range.

19. The at least one non-transitory computer-readable storage medium of claim 13, wherein the assistance information further comprises:
a temporary link-layer identifier for the peer UE.

20. An apparatus of a user equipment (UE) comprising:
a processor comprising logic configured to:
  register an application with a peer-to-peer application server, wherein the logic is configured to transmit an application registration request to register the application with the peer-to-peer application server;
  prepare a proximity request to send to a mobile communications network for network assistance to discover a peer UE, wherein the proximity request comprises application identifier corresponding to the application and an application layer identifier for a user associated with the peer UE;
  report a location of the UE to a Secure User Plane Location (SUPL) Location Platform (SLP); and
  process a proximity alert from the mobile communications network, wherein the proximity alert is sent by the mobile communications network when the mobile communications network detects that the peer UE is within a defined range for discovery based on a location service response from the SLP, wherein the proximity alert comprises assistance information to assist discovery of the peer UE, wherein the processor further comprises logic configured to cause the UE to discover the peer UE based on the assistance information, wherein the assistance information comprises a designated peer-to-peer group owner for direct communications, and a permanent link-layer identifier corresponding to the peer UE.

21. The apparatus of claim 20, wherein the UE and the peer UE are registered with different servers for proximity services.

22. The apparatus of claim 20, wherein the processor further comprises logic configured to prepare a registration request to send to a first mobile communications network to register the UE for proximity services.

23. The apparatus of claim 22, wherein the registration request comprises a link-layer identifier for the UE for direct discovery and communication.

24. The apparatus of claim 20, wherein the application registration request comprises the application identifier and an identifier corresponding to the UE.

25. The apparatus of claim 20, wherein the proximity request further comprises one or more of:
  an identifier corresponding to the peer UE;
  a time window for the proximity request; and
  a discovery range.

26. The apparatus of claim 20, wherein the assistance information further comprises:
  a temporary link-layer identifier for the peer UE.

27. The at least one non-transitory computer-readable storage medium of claim 1, wherein the instructions further cause the one or more processors to process a registration request, wherein a registration request corresponding to the first UE comprises a permanent link-layer device identifier corresponding to the first UE.

* * * * *